United States Patent
Hartmann et al.

(10) Patent No.: US 11,592,298 B2
(45) Date of Patent: Feb. 28, 2023

(54) METHOD FOR DETERMINING ROAD SURFACE CONDITIONS

(71) Applicant: Continental Teves AG & Co. oHG, Frankfurt am Main (DE)

(72) Inventors: Bernd Hartmann, Bad Homburg (DE); Peter Lauer, Karben (DE); Thomas Raste, Oberursel (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 239 days.

(21) Appl. No.: 16/454,275

(22) Filed: Jun. 27, 2019

(65) Prior Publication Data
US 2020/0033137 A1 Jan. 30, 2020

(30) Foreign Application Priority Data
Jul. 27, 2018 (DE) ...................... 10 2018 212 629.1

(51) Int. Cl.
*G01C 21/30* (2006.01)
*B60K 28/16* (2006.01)

(52) U.S. Cl.
CPC .............. *G01C 21/30* (2013.01); *B60K 28/16* (2013.01)

(58) Field of Classification Search
CPC ........ G01C 21/30; G01C 21/32; B60K 28/16; B60W 2520/30; B60W 2520/28; B60W 40/068
See application file for complete search history.

(56) References Cited

U.S. PATENT DOCUMENTS

| 9,676,331 | B2 | 6/2017 | Hartmann | |
|---|---|---|---|---|
| 2010/0023265 | A1* | 1/2010 | Huang | B60W 40/10 702/1 |
| 2016/0176408 | A1* | 6/2016 | Lynch | B60W 40/068 701/23 |
| 2017/0167881 | A1* | 6/2017 | Rander | G05D 1/0214 |
| 2017/0357669 | A1* | 12/2017 | Offenhaeuser | G08G 1/0129 |
| 2019/0389475 | A1* | 12/2019 | Jonasson | G08G 1/096716 |

FOREIGN PATENT DOCUMENTS

| DE | 102012112724 A1 | 6/2014 |
|---|---|---|
| DE | 102016203545 A1 | 9/2017 |

* cited by examiner

*Primary Examiner* — James M McPherson
*Assistant Examiner* — Daniel Tyler Reich
(74) *Attorney, Agent, or Firm* — RatnerPrestia

(57) ABSTRACT

A method for determining road surface conditions in a system with at least one vehicle and a data processing device. The vehicle exchanges data with the data processing device wirelessly. The vehicle has at least one sensor for determining measured values describing a road surface friction coefficient, and a computing unit. The data processing device includes a database, containing a road map having a plurality of route sections. The method includes determining measured values for a route section by the sensor, determining a first friction coefficient for the route section by the vehicle's computing unit, sending a data record, containing measured values and/or the first determined friction coefficient and a piece of information identifying the route section, to the data processing device, determining an average friction coefficient for the route section, sending the average friction coefficient determined for the route section to the vehicle, and determining the road surface condition.

10 Claims, 3 Drawing Sheets

METHOD FOR DETERMINING ROAD SURFACE CONDITIONS

CROSS REFERENCE TO RELATED APPLICATIONS

This application claims priority to German Patent Application No. 10 2018 212 629.1, filed Jul. 27, 2018, the contents of such application being incorporated by reference herein.

FIELD OF THE INVENTION

The invention relates to a method for determining road conditions in a system with at least one vehicle and a data processing device, as well as corresponding methods which are implemented by the vehicle, on the one hand, and by the data processing device on the other hand.

BACKGROUND OF THE INVENTION

The safe determination of road surface conditions, in particular with regard to the friction value of the road surface (also denoted by the friction coefficient, friction number, traction coefficient or friction coefficient $\mu$), is one of the essential factors for the safe operation of driver assistance systems such as ABS, traction control and stability programs. The friction coefficient of a road surface defines the maximum transferable force between the tire and the road surface, and therefore the limits of any corresponding control by a driving assistance system, taking into account other vehicle-specific parameters, such as vehicle mass or tire contact area.

From the prior art a large number of methods and systems for the determination of road surface conditions and, in particular, road friction coefficients, are already known.

For example, DE 10 2016 203 545 A1, incorporated herein by reference, held by the applicant describes a method for determining classes of road surface grip from measured values of a circumferential force on at least one vehicle wheel of a vehicle moving on a road surface, and the wheel slip caused by this circumferential force.

Also, DE 10 2012 112 724 A1, incorporated herein by reference, held by the applicant discloses a method in which a road surface condition is determined from environmental sensor data of a vehicle, in particular from camera data.

SUMMARY OF THE INVENTION

In contrast, an aspect of the present application aims to create an improved method for determining road surface conditions, which improves the precision in the determination of road conditions and extends their application options.

In a first aspect the invention relates to a method for determining road surface conditions in a system with at least one vehicle and a data processing device, wherein the vehicle is designed to exchange data with the data processing device by wireless means. The vehicle also has at least one sensor apparatus for determining measured values that describe a friction coefficient of a road surface, and a computing unit. The data processing device has a database, which contains a road map consisting of a plurality of route sections.

The method comprises determining measured values for a route section by means of the sensor apparatus of the vehicle, determining a first friction coefficient for the route section from the measured values by means of the computing unit of the vehicle, sending a data record, which contains the measured values and/or the first determined friction coefficient and a piece of information identifying the route section, to the data processing device, determining an average friction coefficient for the route section by means of the data processing device, sending the average friction coefficient determined for the route section to the vehicle, and determining the road surface condition by comparing the average friction coefficient with the first determined friction coefficient by the computing unit of the vehicle.

Here, a "data processing device" means any device which is capable of receiving and processing electronic data and forwarding it using appropriate communication channels. For example, the data processing device can be a server architecture, such as a backend server, which can exchange data over the internet with other subscribers on the internet by wired or wireless means. In addition to a physically contiguous computer complex, a data processing device within the meaning of an aspect of the invention, however, can also be implemented in a completely virtual manner, for example, in the sense of a distributed computing architecture in cloud computing.

A "sensor apparatus" of a vehicle in the context of this application describes any device which is capable of collecting measured values that describe physical conditions in the capture range of the sensor apparatus. A single sensor apparatus in this case can be formed from a combination of entirely different sensor types, for example, optical sensors, rotation speed sensors and accelerometers.

A "route section" can describe, for example, a segment of the roadway which is bounded in the longitudinal direction. However, a "route section" could certainly also be subdivided in a more fine-grained way, so that for a sub-region in the longitudinal direction multiple sub-regions in the transverse direction of the road surface can also be taken into account, resulting overall in a grid-based treatment of the road surface.

In the context of the previously described method, a vehicle located within a route section of a road is provided with two separate friction coefficients, each of which describes the road surface condition of a specific section of the route. From the sum of these two values the computing unit of the vehicle can then verify, for example, whether the friction coefficient of a route section determined locally by the vehicle matches the friction coefficient that was transmitted by the data processing device for the same route section. This allows, for example, a malfunction of the local friction coefficient determination to be verified. Effectively, the reliability of the friction coefficient detection and therefore also of the use of the friction coefficients determined by driving safety systems can thus be improved.

In addition to checking for malfunctions of the local friction coefficient determination in the vehicle, by repeated execution of the method for a plurality of route sections it is also possible to verify for a multiplicity of route sections whether too high or too low a coefficient of friction is being systematically determined by the vehicle. By this method, in addition to statistical errors in the friction coefficient detection, it is also possible to detect systematic deviations which may indicate, for example, wear states of vehicle components.

In addition to the local verification of the friction coefficient determination by the vehicle on the basis of the separate friction coefficients, at the same time the vehicle supplies the data processing device with information relating to a route section being driven, which in turn is used by the data processing device to determine an average friction coefficient for a route section. For this purpose, if a plurality of vehicles are participating in the method, the data processing device can derive statistics about the friction coefficients obtained for a route section. By means of a statistical comparison and an appropriate normalization, a common default value for the friction coefficient of the route section may then be defined for all vehicles, for example, by averaging the friction coefficients. The participating vehicles can transfer both a calculated friction coefficient as well as the measurement data used for the calculation to the data processing device.

The calculation of the average friction coefficient for a section of route by means of the data processing device may be both a direct readout from a database with previously calculated friction coefficients and the calculation of a new average friction coefficient taking into account the newly received information.

At this point, it is also noted that the given sequence of the method steps does not stipulate a sequence of the method steps. Instead, the method can be readily carried out in any other sequence, provided this is logically meaningful.

For example, it can be provided that the data processing device transmits the average friction coefficient of a route section to a vehicle before the vehicle travels on the route section. As a result, the vehicle and/or its safety systems can already check in advance whether or which adjustments to the driving parameters are necessary in order to safely traverse the section of the route ahead. As soon as the vehicle arrives at the route section, it can verify, in turn, by means of an appropriate determination of the friction coefficient, whether the friction coefficient is actually the same as the friction coefficient received in advance and can provide the corresponding results to the data processing device for further refinement of the existing data.

The previously described method according to one embodiment can be advantageously designed in such a way that the sensor apparatus has a device for determining a rotation speed of at least one of the wheels of the vehicle, wherein the measured values are determined, at least in part, from a measurement of at least one wheel speed by means of the sensor apparatus.

The embodiment is based on the idea that in allowing for a rotation speed of a vehicle wheel in the determination of a friction coefficient, the result of the determination is influenced by a tire parameter, in particular its grip level. From a comparison of the friction coefficient thus determined with a friction coefficient provided by the data processing device the condition of the tire can therefore be inferred. If, for example, the friction coefficient determined by the vehicle is systematically below the average friction coefficient provided, this may indicate poor-quality or worn tires. Conversely, a determined friction coefficient which is systematically too high can indicate a good tire condition. From a time-resolved analysis of the deviations it is also possible to infer a trend in the condition of the tire, from which it may be extrapolated, for example, when a tire should be changed. The information thus obtained can in turn be used for automated planning of maintenance operations on the vehicle.

However, it is entirely possible that the local evaluation of measurement data by the vehicle will provide a result that contradicts the trend identified by a server from the data of a plurality of vehicles.

In addition to an analysis of wheel speeds to determine a friction coefficient by means of the vehicle, according to a further embodiment it can also be provided that the sensor apparatus has an optical sensor. An optical sensor is understood to mean, for example, a camera or a laser scanner, which is mounted on the vehicle in such a way that it can scan the road surface in the vicinity of the vehicle. Optical sensors have the advantage that with simple means it is possible to detect whether a road surface is wet or dry, which allows the friction coefficient of a road surface to be roughly estimated. By using suitable image processing algorithms, a finer gradation of the friction coefficient and/or evaluation of the road surface is also possible. Furthermore, an optical sensor can be used for checking the plausibility of measurements from other sensor types, for example by detection of water spray during the determination of a friction coefficient, which implies a wet road surface.

According to a further embodiment the sensor apparatus can also be designed in such a way that the measured values include torque values present at the wheels of the vehicle, and the corresponding acceleration of the vehicle. Thus, during an acceleration or deceleration of the vehicle the friction coefficient of the road surface can be determined with a high degree of accuracy. The analysis of the wheel rotation speed of non-accelerating wheels and the corresponding vehicle acceleration can also be used, even at low accelerations, to infer the friction coefficient of the road surface.

The previously described method can be simplified according to a further embodiment, to the effect that the average friction coefficient is subdivided into discrete friction coefficient ranges, wherein the data processing device communicates a piece of information to the vehicle, which identifies the friction coefficient range of a route section. The restriction to ranges of friction coefficients simplifies, inter alia, the interpretation of the information received by the vehicle. Thus on the part of the vehicle it is initially only necessary to check whether the locally determined friction coefficient falls into the friction coefficient range obtained. If this is the case, the functionality of the friction coefficient detection can be assumed to be adequate.

The friction coefficient can be divided into four classes which identify, for example, a dry road surface, a wet road surface, a snow-covered road surface and an icy road surface. The aforementioned classification of the friction coefficients is generally sufficient to guarantee the safe operation of driver assistance systems on the basis of the determined friction coefficients. In particular, on the basis of such friction coefficient classes, a safe operation of automated vehicles can already be guaranteed. A specific differentiation according to tire parameters is generally not necessary if the lower limit of the friction coefficient of a friction coefficient class is used for planning and designing driving maneuvers. However, in designing driving maneuvers a vehicle can also quite possibly assume higher friction coefficients within a friction coefficient class, if these have been determined by the local analysis of the friction coefficient by the vehicle.

The determination of the average friction coefficient of a route section by the data processing device can be extended according to a further embodiment, so that parameters characteristic of the route sections are assigned to each of the route sections in the database, the parameters being taken into account in the determination of the average friction coefficient for the route section. For example, such parameters can include information relating to the gradient of the road surface in the area of the route section. If the friction coefficient is determined based on acceleration values of a vehicle, the measurement error in the calculated acceleration values introduced by the component of the acceleration due to gravity can be compensated. The precision of the method is thereby further improved.

In addition to the previously described consideration of parameters of the route sections by the data processing device, according to another embodiment the accuracy of the procedure can be further improved by having the data processing device take into account information characterizing the weather in the area of the route section when determining the average friction coefficient. For this purpose, the data processing device can access, for example, the information of a weather service. By taking into account weather information, a data record received by a vehicle can be checked for plausibility. For example, it would not be plausible if the information from a data record indicated a very high friction coefficient for a route section when it is apparent from weather information that heavy rain or even snow is occurring in the route section.

According to one embodiment the consideration of weather information by the data processing device can be extended to include the fact that the data processing device assigns to a data record received by a vehicle a piece of information characterizing the date of transmission and/or information characterizing the weather in the area of the route section at the time of transmission of the data record, this information being taken into account in determining an average friction coefficient for the route section. In this way, in the determination of an average friction coefficient from a plurality of data records, it is possible, for example, to take into consideration whether these data records were collected in comparable weather conditions. Accordingly, a weighting of the data records can be applied, wherein in the determination of an average friction coefficient for a given set of weather conditions, data records collected in comparable weather conditions are assigned greater importance in the determination of an average friction coefficient. In the event that the data processing device assigns only the date of transmission of the information to a data record, the weather situation at the time of the data collection can also be reconstructed retrospectively from historical weather data and taken into account accordingly.

A further aspect of the present invention relates to a method for determining a road surface condition by means of a vehicle, wherein the vehicle has at least one sensor apparatus for determining measured values that describe a friction coefficient of a road surface, a computing unit, and a telecommunication interface for exchanging data with a data processing device. The method comprises determining measured values by the sensor apparatus for the route section, determining a first friction coefficient for the route section from the measured values by the computing unit, sending a request for a second friction coefficient to the data processing device via the telecommunication interface, wherein the request identifies the route section, receiving the second friction coefficient for the route section from the data processing device via the telecommunication interface, and determining the road surface condition by comparison of the first friction coefficient and the second friction coefficient.

This aspect of the invention therefore relates to the vehicle-side component of the previously described method. Accordingly, the previously described embodiments can also be applied to this aspect in the same way, insofar as this is technically and logically feasible.

In yet another aspect, the invention relates to a method for determining a friction coefficient of a route section of a road map by a data processing device, wherein the data processing device has a database and a telecommunications interface for exchanging data with a vehicle, wherein the database contains a road map consisting of a plurality of route sections. The method in this case comprises receiving measured values that describe the friction coefficient of a route section from a multiplicity of vehicles via the telecommunications interface, determining the average friction coefficient of the route section from the measurement values, associating the average friction coefficient with the section of the route, and updating the route section of the road map with the associated friction coefficient.

This aspect of the invention therefore relates to the component of the previously described method which is executed in the data processing device. Accordingly, the previously described embodiments can also be applied to this aspect in the same way, insofar as this is technically and logically feasible.

In, this case, the road map, or a route section, can be updated, for example, by the fact that the new average friction coefficient is stored in the database and linked in such a way that in the event of a subsequent retrieval of an average friction coefficient for the route section exactly this average friction coefficient is determined. However, it can also be provided that previously calculated friction coefficients are taken into account when performing an update, or, as is the case in a previously described embodiment, a friction coefficient for a specific weather situation is stored in the road map.

BRIEF DESCRIPTION OF THE DRAWINGS

In the text which follows, examples of individual aspects of the invention as well as preferred embodiments are described in more detail on the basis of the drawings. These show.

DETAILED DESCRIPTION OF THE PREFERRED EMBODIMENTS

In the text which follows, features that are similar or identical are denoted by the same reference signs.

Figure 1:
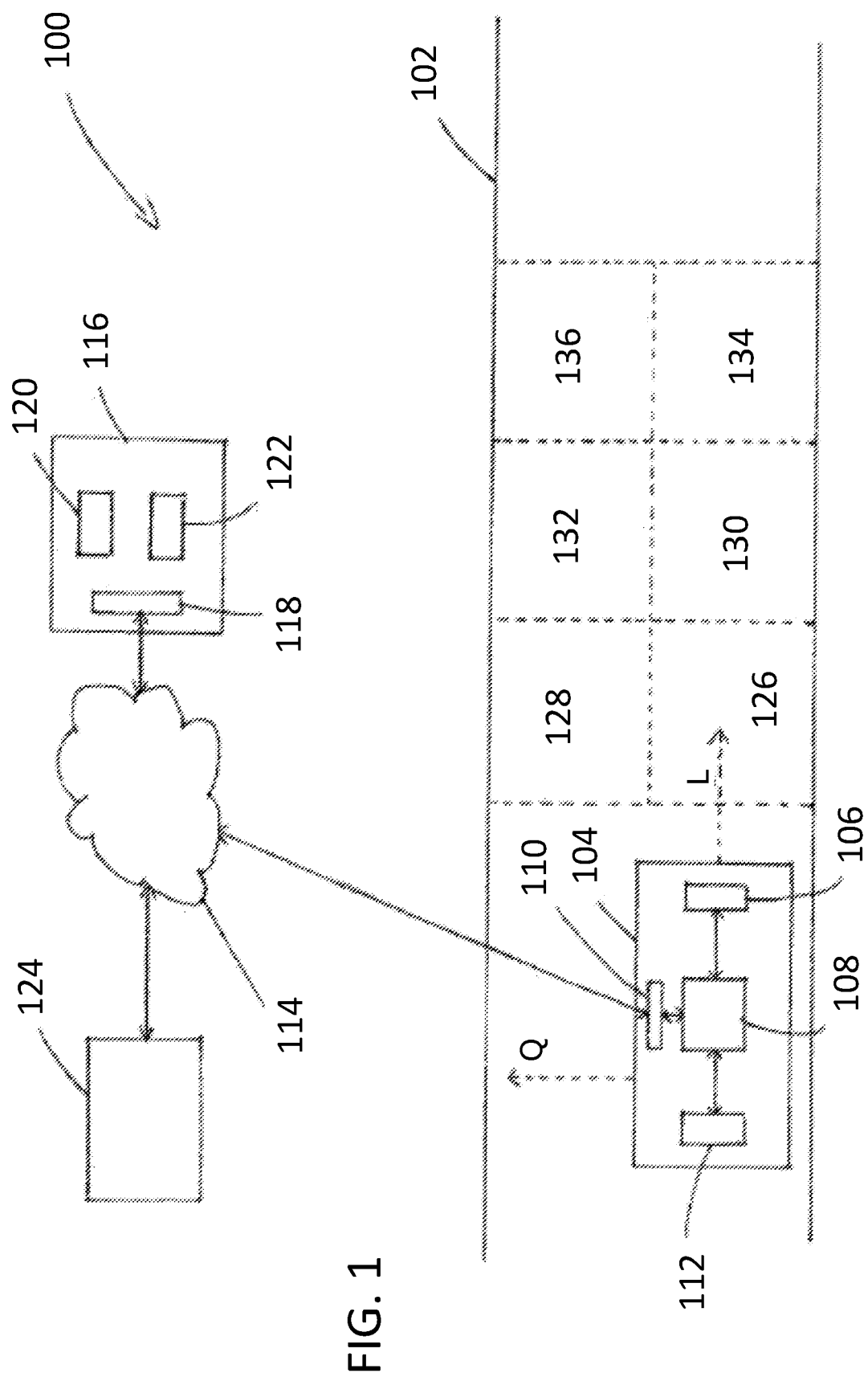
FIG. 1 a schematic illustration of an environment for implementing the method, FIG. 2 a flow diagram of an embodiment of the method, and FIG. 3 a flow diagram of a further embodiment of the method.

FIG. 1 shows a schematic representation of an environment 100 within which the method according to an aspect of the invention can be implemented. The environment 100 shows a partial section of a road surface 102 on which a schematically illustrated vehicle 104, for example a car, is present. The vehicle 104 comprises a sensor apparatus 106, a computing unit 108, a communication interface 110 and a control unit 112.

The sensor apparatus 106 can be either a single sensor or else a collection of different sensors. Thus, the sensor apparatus 106 can be, for example, acceleration sensors for measuring accelerations of the vehicle 104 in the longitudinal direction L or in the transverse direction Q, wheel speed sensors for the individual wheels of the vehicle 104, optical sensors, such as cameras or laser scanners, or any other type of sensor which is suitable for recording dynamic parameters of the vehicle 104 or environmental parameters of the vehicle 104.

The computing unit 108 can be understood as a generic unit for processing electronic data and can be implemented, for example, as a chipset with processor units, working memory, data memory and appropriate input and output channels on a common circuit board, or distributed in the vehicle 104. The computing unit 108 is designed for communication with the sensor apparatus 106, the communication interface 110 and the control unit 112.

The control unit 112 can be designed, at least in part, in the same way as the computing unit 108, or even as part of the computing unit 108. The control unit 112 is essentially a logic which is designed to perform the open-loop and closed-loop control of driving assistance systems based on received parameters. For example, it can be a controller for ABS, TCS, ESP or similar.

The communication interface 110 can be designed as a generic communication interface, which is designed to exchange data wirelessly with a network 114, such as the internet. For this purpose, the communication interface 110 can use, for example, a mobile wireless network to communicate with the network 114.

In addition to the vehicle 104, a data processing device 116 is also connected to the network 114, so that data can be exchanged between the vehicle 104 and the data processing device 116. To this end the data processing device 116 has a communication interface 118 for communicating data over the network 114. In addition, the data processing device 116 has a database 120 and a processing unit 122. Although in FIG. 1 the data processing device 116 is shown as a contiguous block, this is only intended as an example. In fact, the data processing device 116 can also be implemented as a distributed system in the network 114, for example, in the sense of cloud computing.

In the database 120 of the data processing device a road map is preferably stored, which contains a plurality of routes divided into individual route sections. These individual route sections can each be assigned a collection of friction coefficients, which have already been determined in advance from previous measurements. It is also entirely possible that the database 120 for each route section includes friction coefficients for different weather conditions.

Via the network 114, both the data processing device 116 and the vehicle 104 communicate with other services 124. For example, these could involve weather services, route planners or similar.

In FIG. 1 the road surface 102 on which the vehicle 104 is located is represented schematically as a straight section. The section shown is divided by dashed lines into sub-sections 126, 128, 130, 132, 134 and 136. Each of these sub-sections can be understood as a route section in the sense of an aspect of the present invention. Consequently, in addition to a sub-division of the road surface 102 in the longitudinal direction L, a subdivision of the road surface in the transverse direction Q is also entirely conceivable. For example, a separate route section for different sides of the road can be defined. The subdivision can also be more fine-grained than shown in FIG. 1. It is also possible, however, that a route section can mean only a section of the road surface 102 in its longitudinal direction. In this case, for example, the sub-sections 126 and 128, 130 and 132 as well as 134 and 136 can be combined into common sub-sections.

On the basis of the environment 100 shown in FIG. 1, in the text that follows, a first embodiment 200 of the method will be explained on the basis of FIG. 2.

Figure 2:
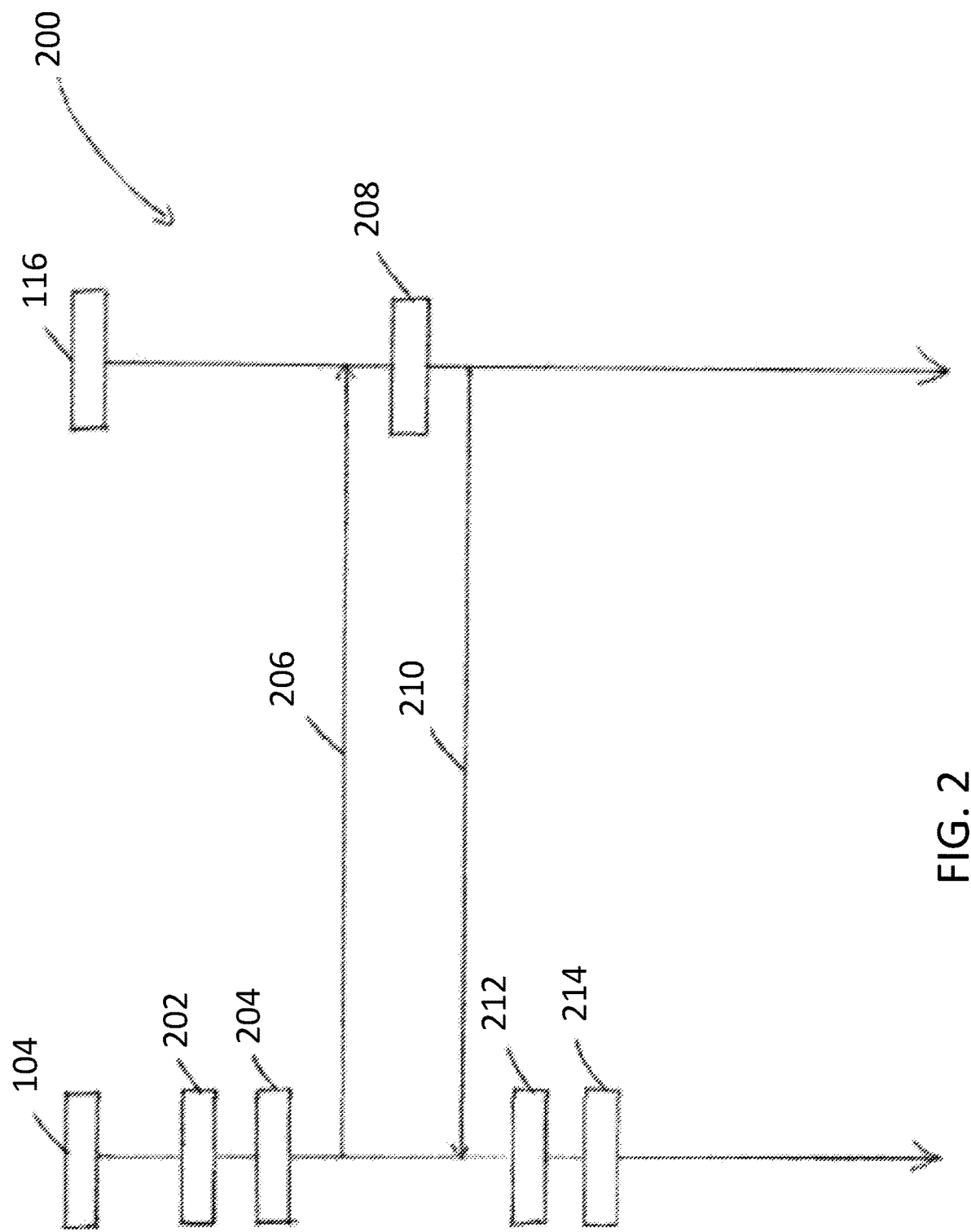

FIG. 2 shows a flow chart, which shows the actions on the part of the vehicle 104 on the left and the actions on the part of the data processing device 116 on the right. The time axis runs from top to bottom.

In the first method step 202 a measurement is carried out by the vehicle 104 by means of the sensor apparatus 106, with the aim of determining measured values that describe the grip of the road surface, represented by a friction coefficient. The measurement is initially limited to a route section 126 directly in front of the vehicle or to a route section within which the vehicle is located at the time of the measurement. In order to determine the friction coefficient a variety of methods can be used, which make use of an optical scanning of the road surface, an analysis of wheel rotation speeds and torques acting on the wheels, an analysis of wheel speed changes of non-driven wheels during a vehicle acceleration, or similar techniques. The measured values obtained generally differ depending on the method used.

The measured values determined are then transferred to the computing unit 108 of the vehicle 104 and evaluated thereby in step 204. The aim of the evaluation is the determination of the friction coefficient of the route section under investigation. The specific friction coefficient for the route section under investigation, together with information identifying the examined route section and other information, such as weather information, a time stamp or similar, is then transmitted in step 206 as a common, data record to the data processing device 116 via the network 114. In addition to the determined friction coefficient, the data record can also contain the measured values which were collected by the vehicle 104 and used to determine the transmitted friction coefficient. In order to identify the route section under investigation, the data record can contain, for example, a GPS position of the vehicle 104 at the time of the measurement.

In step 208 the data processing device 116 then determines an average friction coefficient for the route section which was identified by the information in the data record. For this purpose, the data processing device 116 can first perform an identification of the route section by evaluating the information received from the data record and localizing the position of the vehicle in the road map, which is stored in the database 120. The processing unit 122 of the data processing device 116 can subsequently retrieve, for example, corresponding friction coefficients from the database 120 for the determined route section and taking into account the information received, calculate an average friction coefficient. For this purpose, for example, a statistical analysis of the friction coefficients of the route section can be performed, for example, an averaging. Particular consideration is preferably given to friction coefficients which were recorded in a weather situation which is the same as the weather situation identified in the data record.

After determination of the average friction coefficient it may also be provided that the data processing device 116 updates the road map stored in the database 120 with the newly received information from the data record.

The calculated average friction coefficient is then transmitted to the vehicle 104 in step 210.

The vehicle 104 then evaluates the average friction coefficient obtained, by means of the computing unit 108. To this end, to determine the road surface condition a comparison is performed to find the extent to which the average friction coefficient obtained for the route section matches the friction coefficient that was determined by the vehicle 104 itself. If it is determined that the friction coefficients correspond very closely, it can be assumed that the friction coefficient correctly describes the road surface condition. The friction coefficient can then be transferred to the control unit 112 and used by the latter in step 214 for controlling driving assistance systems.

If it is found, however, that the friction coefficients do not match then this may indicate measurement errors or signs of wear on the vehicle. For example, if the friction coefficient is determined from tire-specific variables, then a coefficient of friction determined by the vehicle which is too low can indicate increased tire wear.

In this case it can be provided that for safety reasons, only the lower friction coefficient of the average friction coefficient and the calculated friction coefficient is always passed on to the control unit 112, in order to avoid an overestimation of the friction coefficient.

To simplify the method it can also be provided that the data processing device 116 does not transfer a specific average friction coefficient to the vehicle 104, but a range of friction coefficients for a route section. In this case, in step 212 it would be checked by the vehicle whether the friction coefficient determined by the vehicle 104 is within the received friction coefficient range. A more detailed assessment of the situation of the vehicle, e.g. with regard to signs of wear and tear, can then be carried out by checking whether the friction coefficient determined by the vehicle 104 is closer to the upper limit of the received friction coefficient range or to its lower limit. Preferably, the lower limit of the received friction coefficient range is always transmitted to the control unit 112, so that an overestimate of the friction coefficient is avoided.

If, however, a friction coefficient which lies in the upper part of the friction coefficient range was determined by the vehicle 104, then the vehicle can by all means also transfer the high friction coefficient calculated to the control unit 112 to better exploit the existing possibilities of the vehicle.

By means of the method described in FIG. 2, the vehicle 104 is enabled to make an estimate of the calculated friction coefficients by a comparison with average friction coefficients for a section of the route already traveled. At the same time the data processing device 116 receives data from the vehicle 104, which enable a refinement of the road map stored in the data base 120.

Figure 3:
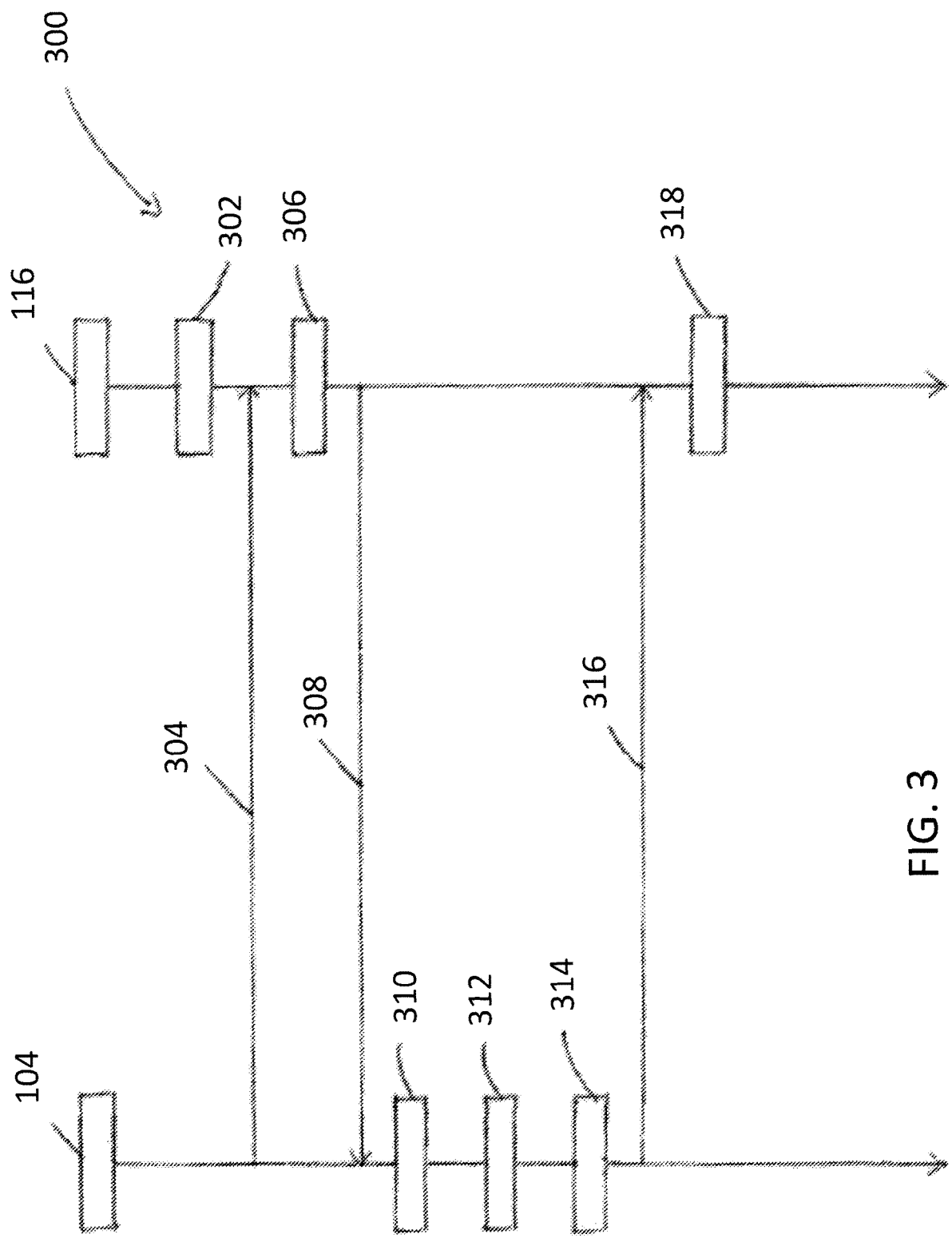

FIG. 3 shows an alternative embodiment of the method. The following text essentially discusses the respective differences.

In the method 300 of FIG. 3, in a first step 302 the data processing device 116 creates the road map stored in the database 120, for example, from data which were received in advance from other vehicles.

In step 304 the vehicle 104 then sends a request to the data processing device 116, in which the friction coefficient is queried for a route section which the vehicle 104 will drive over in the near future. Similarly to the previously described method 200, in response to the request the data processing device 116 determines the average friction coefficient for the requested route section (step 306), for example, by reading them off the road map.

The resulting average friction coefficient is then transmitted to the vehicle 104 in step 308.

The vehicle 104 or the control unit 112 is therefore in a position to estimate in advance whether an adjustment of driving parameters of the vehicle 104 is necessary in order to safely drive over the section of road ahead. Accordingly, in step 310 the vehicle 104 uses the average friction coefficient obtained for planning the rest of the journey.

As soon as the vehicle 104 has actually arrived at the said route section in step 312, it carries out measurements with the sensor apparatus 106 in turn, to obtain measured values for the determination of the friction coefficient of the route section.

The measured values thus determined are then evaluated in step 314 and the resulting friction coefficient is compared with the average friction coefficient determined in advance, in a similar way to the method 200 described above.

Then, the determined measurement data, the friction coefficient and additional information, also analogously to the method 200 described above, are transmitted in step 316 to the data processing device 116 in the form of a data record, so that in step 318 the data processing device 116, in turn, can update the information from the road map stored in the database 120 on the basis of the received data record.

LIST OF REFERENCE NUMERALS 100 system
102 road surface
104 vehicle
106 sensor apparatus
108 computing unit
110 communication interface
112 control unit
114 network
116 data processing device
118 communication interface
120 database
122 processing unit
124 services

The invention claimed is:

1. A system for determining road surface conditions, the system comprising:
   a vehicle including:
      a vehicle sensor for determining measured values that describe a friction coefficient of a road surface, and
      a vehicle processor;
   a server including:
      a database which contains a road map of a plurality of route sections, and
      a server processor,
   wherein the system is configured to:
      determine, by the vehicle sensor, measured values for a route section being traveled on by the vehicle,
      determine, by the vehicle processor, a first determined friction coefficient for the route section from the measured values,
      send, by the vehicle processor, a data record, which contains the measured values and/or the first determined friction coefficient and a piece of information identifying the route section, to the server,
      determine, by the server processor, an average friction coefficient for the route section based on friction coefficients received from previous vehicles that previously traveled on the route section,
      send, by the server processor, the average friction coefficient determined for the route section to the vehicle,
      determine, by the vehicle processor, the road surface conditions by comparing the average friction coefficient with the first determined friction coefficient,
      determine, by the vehicle processor, that tires of the vehicle are worn out when a comparison performed over the plurality of route sections indicates that the first determined friction coefficient is less than the average friction coefficient,
      in response to determining that the tires of the vehicle are worn out, control, by the vehicle processor, the vehicle based on a lower friction coefficient that is less than the average friction coefficient, determine, by the vehicle processor, that tires of the vehicle are not worn out when the comparison performed over the plurality of route sections indicates that the first determined friction coefficient is greater than the average friction coefficient, in response to determining that the tires of the vehicle are not worn out, control, by the vehicle processor, the vehicle based on the average friction coefficient that is less than the first determined friction coefficient, and wherein the vehicle processor ensures the use of the lower of the average friction coefficient and the first determined friction coefficient for controlling the vehicle.

2. The system as claimed in claim 1, wherein the vehicle sensor is a device for determining a rotation speed of at least one of a plurality of wheels of the vehicle, and wherein the measured values are determined, at least in part, from a measurement of at least one wheel speed by the vehicle sensor.

3. The system as claimed in claim 2, wherein the vehicle sensor is an optical sensor.

4. The system as claimed in claim 1, wherein the vehicle sensor is an optical sensor.

5. The system as claimed in claim 1, wherein the measured values include torque values acting on at least one of the plurality of wheels of the vehicle and a corresponding acceleration of the vehicle.

6. The system as claimed in claim 1, wherein the average coefficient of friction is sub-divided into discrete friction coefficient ranges, wherein the vehicle processor transmits a piece of information to the vehicle which identifies the discrete friction coefficient ranges of the route section.

7. The system as claimed in claim 1, wherein the plurality of route sections in the database are each assigned parameters characterizing each of the plurality of route sections, the parameters being taken into account by the server processor during the determining of the average friction coefficient associated with the route section.

8. The system as claimed in claim 1, wherein in determining a mean friction coefficient, the vehicle processor takes into account a piece of information characterizing weather in an area of the route section.

9. The system as claimed in claim 8, wherein the vehicle processor assigns to a data record received from the vehicle a piece of information characterizing a date of the send, by the vehicle processor, the data record and/or the weather in the area of the route section at a time of the send, by the vehicle processor, the data record, said information being taken into account in determining an average friction coefficient for the route section.

10. A vehicle for determining road surface conditions, the vehicle comprising:
a vehicle sensor for determining measured values that describe a friction coefficient of a road surface; and
a vehicle processor configured to:
determine, by the vehicle sensor, measured values by the vehicle sensor apparatus for one route section being traveled on by the vehicle,
determine, by the vehicle processor, a first determined friction coefficient for the one route section from the measured values,
send, by the vehicle processor, a request for a second friction coefficient to a device server via a telecommunication interface, wherein the request contains the measured values and/or the first determined friction coefficient and a piece of information that identifies the one route section,
receive, by the vehicle processor, an average friction coefficient for the one route section from the device server via the telecommunication interface, the average friction coefficient being based on friction coefficients received from previous vehicles that previously traveled on the one route section,
determine, by the vehicle processor, the road surface conditions by comparison of the first friction coefficient and the average friction coefficient,
determine, by the vehicle processor, that tires of the vehicle are worn out when the comparison performed over a plurality of route sections indicates that the first determined friction coefficient is less than the average friction coefficient,
in response to determining that the tires of the vehicle are worn out, control, by the vehicle processor, the vehicle based on a lower friction coefficient that is less than the average friction coefficient,
determine, by the vehicle processor, that tires of the vehicle are not worn out when the comparison performed over the plurality of route sections indicates that the first determined friction coefficient is greater than the average friction coefficient, and
in response to determining that the tires of the vehicle are not worn out, control, by the vehicle processor, the vehicle based on the average friction coefficient that is less than the first determined friction coefficient, p2 wherein the vehicle processor ensures the use of the lower of the average friction coefficient and the first determined friction coefficient for controlling the vehicle.

\* \* \* \* \*